Figure 1:
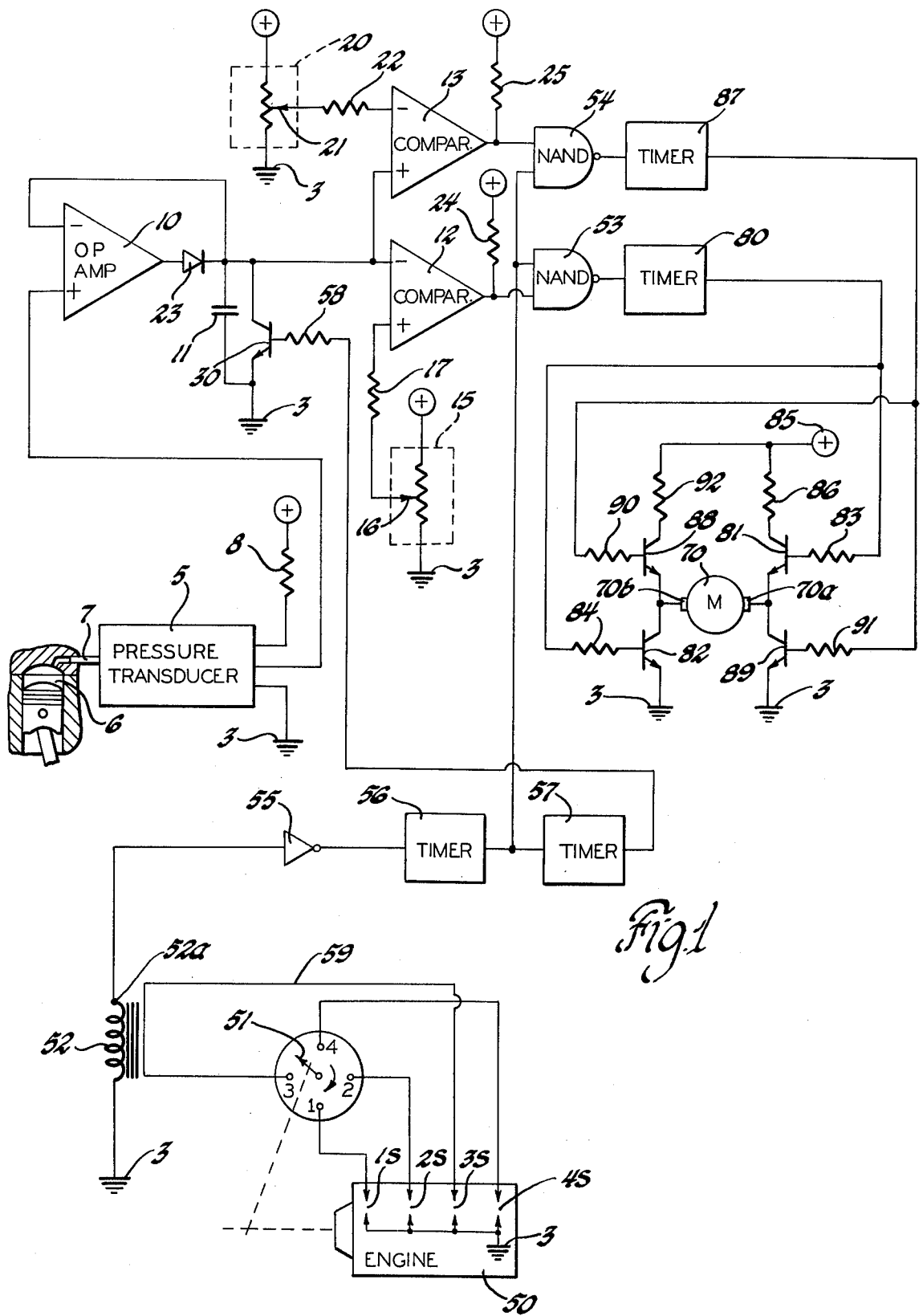

United States Patent [19]

Sand

[11] 4,116,175
[45] Sep. 26, 1978

[54] INTERNAL COMBUSTION ENGINE IGNITION SPARK TIMING SYSTEM MODULATED BY CYLINDER COMBUSTION PRESSURE

[75] Inventor: Roger D. Sand, Kokomo, Ind.

[73] Assignee: General Motors Corporation, Detroit, Mich.

[21] Appl. No.: 709,493

[22] Filed: Jul. 28, 1976

[51] Int. Cl.$^2$ .............................................. F02P 5/04
[52] U.S. Cl. ........................... 123/117 R; 123/119 ED
[58] Field of Search ....... 123/117 A, 117 R, 119 ED; 60/276, 285

[56] References Cited

U.S. PATENT DOCUMENTS

| 2,407,652 | 9/1946 | Costa | 123/117 R |
| 2,595,524 | 5/1952 | Henneman | 123/119 ED |
| 3,875,912 | 4/1975 | Bullo | 123/117 R |
| 3,900,014 | 8/1975 | Bundesen | 60/276 |
| 4,019,474 | 4/1977 | Nishimiya | 60/276 |

*Primary Examiner*—Ronald B. Cox
*Attorney, Agent, or Firm*—Richard G. Stahr

[57] ABSTRACT

An analog signal of a direct current potential magnitude proportional to the peak combustion pressure of a monitored internal combustion engine cylinder is simultaneously applied to two mutually exclusive comparator circuits, each being arranged to produce a separate respective output signal when the monitored cylinder peak combustion pressure is less than a first predetermined value or greater than a second higher predetermined value. With a signal present upon the output of either comparator circuit, upon the occurrence of a clock signal produced when another selected engine cylinder is later fired, either an ignition spark advance or an ignition spark retard signal is produced as determined by the comparator circuit output signal present. The adjustable ignition spark timing mechanism of an associated ignition distributor is operated to retard the ignition spark in response to an ignition spark retard signal and to advance the ignition spark in response to an ignition spark advance signal. A reset signal produced after the clock signal resets the circuit in preparation for the next firing of the monitored cylinder.

5 Claims, 3 Drawing Figures

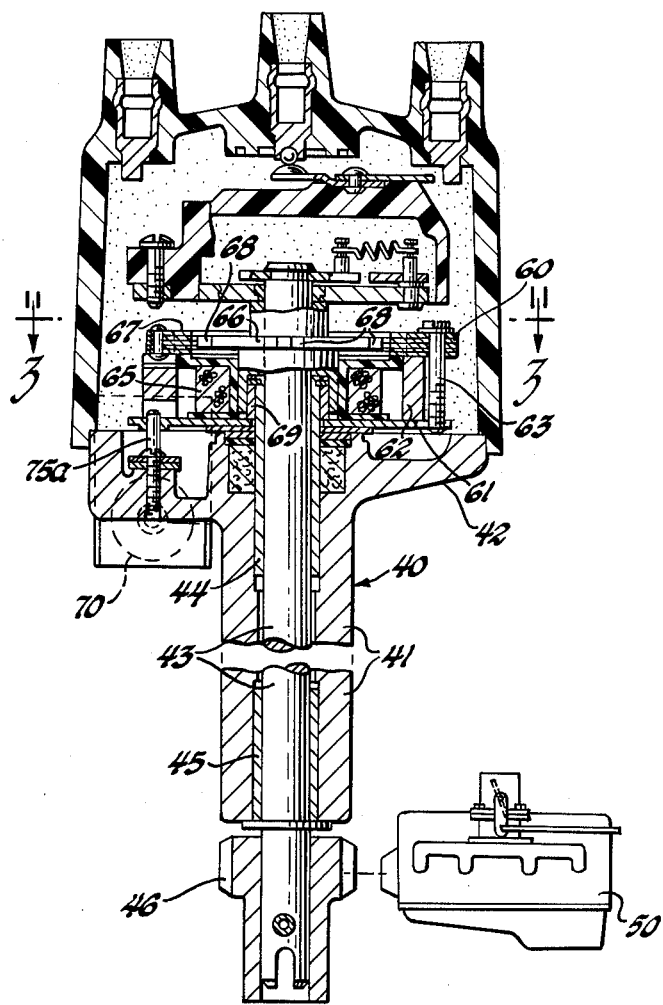

INTERNAL COMBUSTION ENGINE IGNITION SPARK TIMING SYSTEM MODULATED BY CYLINDER COMBUSTION PRESSURE

This invention is directed to an internal combustion engine ignition spark timing system and, more specifically, to an internal combustion engine ignition spark timing system modulated by the peak combustion pressure of a monitored engine cylinder.

Ignition spark timing for most internal combustion engines is established by engine speed and load. The engine speed ignition spark advance is produced by centrifugal weights rotated by the distributor shaft which, as engine speed increases, operate the ignition spark initiating mechanism to advance the ignition spark and the engine load ignition spark advance is produced by a vacuum actuator unit or vacuum motor in communication with engine intake manifold vacuum. A particular disadvantage of the conventional centrifugal and vacuum ignition spark advance system is that the ignition spark advance follows a predetermined ignition spark advance curve designed into the ignition distributor regardless of conditions under which the engine is currently operating. It has been found that the efficiency and emission output level of an internal combustion engine may be significantly improved by initiating the ignition spark at the crankshaft position which will result in a peak cylinder combustion pressure of a predetermined maximum value. Therefore, an internal combustion engine ignition spark timing system which initiates the ignition spark for each engine cylinder at the engine crankshaft position which will result in a peak cylinder combustion pressure of substantially the predetermined magnitude is desirable.

It is, therefore, an object of this invention to provide an improved internal combustion engine ignition spark timing system.

It is another object of this invention to provide an improved internal combustion engine electronic ignition spark timing system modulated by peak cylinder combustion pressure.

It is an additional object of this invention to provide an improved internal combustion engine ignition spark timing system which advances the ignition spark when the peak cylinder combustion pressure is less than a first predetermined value and retards the ignition spark when the peak cylinder combustion pressure is greater than a second higher predetermined value.

In accordance with this invention, an internal combustion engine ignition spark timing system modulated by peak cylinder combustion pressure is provided wherein, upon the occurrence of a clock signal, an ignition spark advance or an ignition spark retard signal is produced when the peak cylinder combustion pressure of a monitored engine cylinder is less than a first predetermined value or greater than a second higher predetermined value, respectively, and an associated ignition distributor adjustable ignition spark advance mechanism is operated to retard or advance the ignition spark in response to the ignition spark retard signal or the ignition spark advance signal, respectively.

For a better understanding of the present invention, together with additional objects, advantages and features thereof, reference is made to the following description and accompanying drawing in which:

FIG. 1 sets forth the internal combustion engine ignition spark timing system of this invention partially in schematic and partially in block form;

FIG. 2 is an elevation view in section of an internal combustion engine ignition distributor with which the ignition spark timing system of this invention may be used; and FIG. 3 is a section view of FIG. 2 taken along lines 3—3 and looking in the direction of the arrows.

As point of reference or ground potential is the same point electrically throughout the system, it has been illustrated by the accepted schematic symbol in FIG. 1 and referenced by the numeral 3.

In the interest of reducing the complexity of FIG. 1 of the drawing, a specific operating potential supply has not been shown. It is to be understood that all of the points identified by a plus sign within a circle are connected to the positive polarity output terminal of any well-known source of direct current potential, such as an automotive type storage battery, having a direct current output potential magnitude consistent with the operating potential requirements of the circuitry of FIG. 1.

The combustion pressure during the power stroke of a selected cylinder of an associated internal combustion engine is monitored and circuitry is provided for producing an electrical peak cylinder combustion pressure indicating signal of a potential magnitude directly proportional to the peak combustion pressure of the monitored engine cylinder. The input port of a conventional pressure transducer 5 is placed in communication with the combustion chamber 6 of the selected monitored engine cylinder through a pressure line 7. Pressure transducer 5 may be any suitable commercially available linear pressure transducer well-known in the art of a type capable of producing a direct current output potential which increases linearly with input pressure. One example of a linear pressure transducer suitable for use with this application is marketed by the National Semiconductor Corporation of Santa Clara, California and is designated as the LX1400A Series of highly accurate, temperature compensated linear pressure transducers. Operating potential is supplied to pressure transducer 5 through current limiting resistor 8. The pressure transducer 5 ouput direct current potential signal, which increases linearly as the combustion pressure of combustion chamber 6 increases in magnitude, is applied to the non-inverting input terminal of a conventional operational amplifier circuit 10 connected as a voltage follower. The pressure transducer 5 output signal is amplified by operational amplifier 10, the output potential of which charges capacitor 11. The charge upon capacitor 11, hereinafter referred to as the peak cylinder combustion pressure indicating signal, is simultaneously applied to the inverting input terminal of a well-known comparator circuit 12 and to the non-inverting input terminal of another well-known comparator circuit 13. A reference voltage of a magnitude equal to the voltage drop across movable contact 16 of a conventional potentiometer 15 and point of reference or ground potential 3 is applied through resistor 17 to the non-inverting input terminal of comparator circuit 12 and a reference voltage of a magnitude equal to the voltage drop across movable contact 21 of a conventional potentiometer 20 and point of reference or ground potential 3 is applied through resistor 22 to the inverting input terminal of comparator circuit 13. Movable contact 16 of potentiometer 15 is adjusted to the point at which the reference voltage applied to the non-inverting terminal of comparator circuit 12 is equal to the charge upon capacitor 11 as produced by a peak cylinder combustion pressure substantially equal to a first predetermined low peak combustion pressure value. Movable contact 21 of potentiometer circuit 20 is also adjusted to the point at which the reference voltage applied to the inverting input terminal of comparator circuit 13 is equal to the charge upon capacitor 11 as produced by a peak cylinder combustion pressure substantially equal to a second higher predetermined high peak combustion pressure value. Diode 23 prevents capacitor 11 from discharging back through the output transistor of operational amplifier 10 and resistors 24 and 25 are pull-up resistors for respective comparator circuits 12 and 13, the output terminal of each of which is the uncommitted collector of a grounded emitter NPN output transistor. The collector-emitter electrodes of an NPN transistor 30 are connected across capacitor 11 to provide a discharge circuit therefor in a manner to be later explained.

Operational amplifier 10 and comparator circuits 12 and 13 may be selected from commercially available integrated circuit modules. One example of a commercially available operational amplifier circuit suitable for use as operational amplifier 10 is one section of an LM124 quad operational amplifier package marketed by the National Semiconductor Corporation and one example of a commercially available comparator circuit suitable for use as comparator circuits 12 and 13 is one section of an LM339 quad comparator package also marketed by the National Semiconductor Corporation.

When the peak cylinder combustion pressure of combustion chamber 6 is less than the first predetermined low peak combustion pressure value, the peak cylinder combustion pressure indicating signal across capacitor 11 is less than the reference voltage applied to the non-inverting input terminal of comparator circuit 12 and the reference voltage applied to the inverting input terminal of comparator circuit 13. Consequently, when the peak cylinder combustion pressure of combustion chamber 6 is less than the first predetermined low peak cylinder combustion pressure value, a logic 1 signal appears upon the output terminal of comparator circuit 12 and a logic 0 signal appears upon the output terminal of comparator circuit 13. When the peak cylinder combustion pressure of combustion chamber 6 is greater than the second higher predetermined high peak cylinder combustion pressure value, the peak cylinder combustion pressure indicating signal across capacitor 11 is greater than the reference voltage applied to the non-inverting input terminal of comparator circuit 12 and the reference voltage applied to the inverting input terminal of comparator circuit 13. Consequently, when the peak cylinder combustion pressure of combustion chamber 6 is greater than the second higher predetermined high peak cylinder combustion pressure value, a logic 0 signal appears upon the output terminal of comparator circuit 12 and a logic 1 signal appears upon the output terminal of comparator circuit 13. With conditions of combustion chamber 6 peak cylinder combustion pressure greater than the first predetermined low peak combustion pressure value and less than the second predetermined higher predetermined high peak cylinder combustion pressure value, the peak cylinder combustion pressure indicating signal across capacitor 11 is greater than the reference voltage applied to the non-inverting input terminal of comparator circuit 12 and less than the reference voltage applied to the inverting input terminal of comparator circuit 13. Consequently, when the combustion chamber 6 peak cylinder combustion pressure is within the first predetermined low peak cylinder combustion pressure value low limit and the second higher predetermined high peak cylinder combustion pressure value high limit, a logic 0 signal appears upon the output terminal of each of comparator circuits 12 and 13, a condition which indicates no ignition spark timing adjustment is required as the peak cylinder combustion pressure of combustion chamber 6 is within the predetermined low and high peak cylinder combustion pressure limits. For purposes of this application, it will be assumed that a logic 1 signal is of a positive polarity potential and a logic 0 signal is ground potential.

In a manner to be later explained in detail, the internal combustion engine ignition spark timing system of this invention may be employed to energize a bidirectional direct current electric motor arranged to operate the ignition spark initiating mechanism of the ignition distributor of an associated internal combustion engine to advance the ignition spark when the peak cylinder combustion pressure indicating signal is of a potential magnitude less than the first predetermined low cylinder combustion pressure value and to retard the ignition spark when the peak cylinder combustion pressure indicating signal is greater than the second higher predetermined high cylinder combustion pressure value. In a practical application, the ignition spark timing system of this invention was employed to energize a bidirectional direct current electric motor arranged to operate the ignition spark initiating mechanism of a modern internal combustion engine ignition distributor of the magnetic pickup type. It is to be specifically understood, however, that the actuator unit of this invention is equally suitable for use with ignition distributors of the type having ignition distributor breaker contacts or contact sets mounted upon a rotatable breaker plate of the type well-known in the prior automotive art. It is only necessary that the ignition spark initiating mechanism for initiating the generation of an ignition spark potential for each cylinder of and in timed relationship with the associated engine be of the type which is operable to vary the time the ignition spark potential is initiated.

Referring to FIG. 2 of the drawing, the reference numeral 40 designates the ignition distributor base which includes a tubular portion 41 and an annular portion 42. A shaft member 43 is journaled by the pair of sleeve type bearing bushings 44 and 45 which are fitted within enlarged bores formed in tubular portion 41. The shaft member 43 is rotated in timed relationship with an associated internal combustion engine 50 through gear 46 which is arranged to be in meshing engagement with a suitable corresponding gear in the associated internal combustion engine 50, as is well-known in the automotive and internal combustion engine art.

A magnetic pickup assembly and rotor rotated within annular portion 42 of distributor base 40 produce the ignition signal potential pulses which initiate the generation of an ignition spark potential for each cylinder of engine 50. The magnetic pickup assembly includes a pole piece 60 of a magnetic material, an annular timing plate 61 of a magnetic material, an annular permanent magnet 62 which is clamped between pole piece 60 and timing plate 61 by a plurality of fastening devices 63 and a pickup coil 65. Pole piece 60 has a plurality of circumferentially spaced pole piece teeth 67 protruding from the wall and extending radially inwardly into the cylindrical bore thereof, as is best illustrated in FIG. 3, the number of pole piece teeth required being equal to the number of cylinders of the associated internal combustion engine. Timing plate 61 is secured, in any suitable manner, to an annular bearing part 69 which is journaled on the top end of the bearing bushing 44. Bearing part 69 serves to journal the entire magnetic pickup assembly, consequently, the magnetic pickup assembly may be rotated as a unit around the longitudinal axis of shaft 43. As pole piece 60 is a part of the magnetic pickup assembly, it may be rotated or adjusted about the longitudinal axis of shaft 43 along with the magnetic pickup assembly.

Rotor member 66 is made up of a magnetic material and has a plurality of circumferentially spaced outwardly extending rotor teeth 68 equal in number to the number of cylinders of the associated internal combustion engine. Rotor member 66 is positioned within the cylindrical bore of pole piece 60 so that its outwardly extending rotor teeth 68 are swung in close proximity to the radially inwardly extending pole piece teeth 67 as rotor member 66 is rotated by shaft 43 through gear 46 and engine 50 in a manner well-known in the art. Consequently, as each rotor tooth 68 approaches, is adjacent to and passes one of the pole piece teeth 67, the reluctance of the magnetic circuit for the magnetic flux produced by annular permanent magnet 62 is varied. The magnetic flux linking pickup coil 65 increases as a rotor tooth, approaches a pole piece tooth 67, is of a maximum value when a rotor tooth 68 is adjacent a pole piece tooth 67 and decreases as a rotor tooth 68 moves from a pole piece 67. This change of magnetic flux concentration induces an alternating current ignition signal potential pulse in pickup coil 65 corresponding to each rotor tooth 68. An associated electronic ignition system circuit, not shown, sensitive to each of these ignition signal potential pulses, produces an ignition spark potential upon the occurrence of each ignition signal potential pulse in a manner well-known in the art.

As rotor member 66 is rotated in timed relationship with engine 50, the magnetic pickup assembly including pole piece 60, annular timing plate 61, annular permanent magnet 62, and pickup coil 65 and rotor member 66 comprise an ignition spark initiating mechanism for initiating the generation of an ignition spark potential for each cylinder of and in timed relationship with engine 50. The magnetic pickup assembly is rotatable as a unit about the longitudinal axis of shaft 43, consequently, the time in which each ignition signal potential pulse is created may be varied by rotating the magnetic pickup assembly as any rotation of the magnetic pickup assembly changes the time, relative to engine crankshaft position, that a rotor tooth passes close by a stator tooth. That is, when the magnetic pickup assembly is rotated in a direction the same as the direction of rotation of rotor member 66, each ignition signal potential pulse is produced at a later time relative to the position of the engine crankshaft and as the magnetic pickup assembly is rotated in a direction against the rotation of rotor member 66, each ignition signal pulse is produced at an earlier time relative to engine crankshaft position. Therefore, the ignition spark initiating mechanism of FIGS. 2 and 3 for initiating the generation of an ignition spark potential for each cylinder of and in timed relationship with engine 50 is of the type which is operable to vary the time each ignition spark potential signal is initiated through the medium of rotating the rotatably mounted magnetic pickup assembly which is a part thereof. To rotate the magnetic pickup assembly of the ignition distributor about the longitudinal axis of shaft 43, the shaft 71 of a direct current bidirectional or reversible electric motor 70 is drivingly coupled to the lead screw 72, as best illustrated in FIG. 3. A carriage member 73 in operative engagement with lead screw 72 is moved in a direction toward electric motor 70 when lead screw 72 is rotated thereby in one direction and is moved in a direction away from motor 70 when lead screw 72 is rotated thereby in the opposite direction, as is well-known in the art. To operatively couple carriage member 73 to the magnetic pickup assembly of the ignition distributor ignition spark initiating mechanism, an operating rod 75 is secured at one end by a set screw 76 to carriage member 73, the other end 75a thereof being provided with a "hook" or bentover portion. This "hook" or bentover portion is arranged to protrude through a hole provided therefor in annular timing plate 61 as is best seen in FIG. 2. The motor 70 and lead screw 72 assembly is secured to the annular portion 42 of the ignition distributor through a bracket 74 and mounting screws 77 and 78.

Referring to FIG. 1, engine 50 is illustrated to be of the four cylinder type having four spark plugs 1S, 2S, 3S and 4S. Engine 50 is arranged to drive the distributor rotor 51 in a clockwise direction as is well-known in the automotive art.

It has been determined that, with high turbulence combustion chambers, the peak cylinder combustion pressure should be approximately 400 lbs. per square inch (400 psi) for compromise of maximum engine efficiency and minimum emission levels and that the peak cylinder combustion pressure may be increased as the turbulence decreases or as the amount of exhaust gas recirculated is increased. To prepare the ignition spark timing system of this invention for operating a selected engine, movable contacts 16 and 21 of respective potentiometers 15 and 20 are adjusted until the potential across each and point of reference or ground potential 3 is equal to the potential value of the charge which will be placed upon capacitor 11 when the peak cylinder combustion pressure in combustion chamber 6 of the monitored engine cylinder is equal to the first predetermined low peak cylinder combustion pressure value and the second higher predetermined high peak cylinder combustion pressure value, respectively, for example, 350 psi and 450 psi.

For the purpose of describing the operation of the timing system of this invention, it will be assumed that engine cylinder No. 1 is the monitored engine cylinder and that the firing order of engine 50 is 1-3-4-2.

To produce an electrical clock signal in response to the firing of an engine cylinder other than the monitored engine cylinder, an electrical pickup coil 52 is magnetically coupled to the engine spark plug 3S lead 59. Upon the firing of spark plug 3S corresponding to engine cylinder No. 3, an electrical signal of a positive polarity upon the terminal end 52a of pickup coil 52 with respect to point of reference or ground potential 3 is generated in pickup coil 52 in a manner well-known in the art.

Assuming engine 50 is in the "Run" mode, upon the firing of monitored engine cylinder No. 1, the cylinder combustion pressure within combustion chamber 6 increases. The resulting linearly increasing direct current output potential of pressure transducer 5 is amplified by operational amplifier 10, the output potential of which charges capacitor 11. Assuming that the peak cylinder combustion pressure in combination chamber 6 does not increase to the first predetermined low peak cylinder combustion pressure value during this combustion period, the peak cylinder combustion pressure indicating signal across capacitor 11 is of a potential magnitude less than the reference voltage applied to each of comparator circuits 12 and 13. With this condition, a logic 1 signal appears upon the output terminal of comparator circuit 12 which is applied to one of the input terminals of a conventional NAND gate 53 and a logic 0 signal appears upon the output terminal of comparator circuit 13 which is applied to one of the input terminals of another conventional NAND gate 54. As engine 50 continues to run, an ignition spark potential is next initiated for engine cylinder No. 3 which is directed to engine spark plug 3S through distributor rotor 51 and spark plug lead 59 in a manner well-known in the automotive art. The increasing magnetic flux field resulting from the flow of arc current through lead 59 induces an electrical signal in pickup coil 52 of a positive polarity upon terminal end 52a thereof with respect to point of reference or ground potential 3. This electrical signal is inverted by a conventional commercially available inverter circuit 55 and applied to the input terminal of a commercially available electronic timer circuit 56. Upon the fall of the output signal of inverter circuit 55 toward ground potential, timer circuit 56 is triggered to the condition in which a logic 1 output clock signal appears upon the output terminal thereof which is simultaneously applied to the other input terminal of each of the two input NAND gates 53 and 54. As a NAND gate produces a logic 0 output signal only with the presence of a logic 1 signal upon both of the input terminals thereof, a logic 1 signal is present upon the output terminal of NAND gate 54 and a logic 0 signal appears upon the output terminal of NAND gate 53. Upon the fall of the NAND gate 53 output signal, a conventional commercially available electronic timer circuit 80 is triggered to the condition in which a logic 1 ignition spark advance signal is present upon the output terminal thereof which is applied to the base electrode of each of NPN transistors 81 and 82 through respective resistors 83 and 84 in the proper polarity relationship to produce base-emitter drive current through an NPN transistor. This base-emitter drive current triggers transistors 81 and 82 conductive through the collector-emitter electrodes thereof to complete an energizing circuit for motor 70 which may be traced from the positive polarity terminal 85 of the direct current potential source, through resistor 86, the collector-emitter electrodes of transistor 81, through motor 70 in a direction from brush 70a to brush 70b, through the collector-emitter electrodes of transistor 82 and point of reference or ground potential 3 to the negative polarity terminal of the direct current potential source. Motor 70 is so arranged that with current flow therethrough from brush 70a toward brush 70b, the direction of rotation thereof is such that lead screw 72 of FIG. 3 is rotated in the direction which will move carriage member 73 in a direction toward motor 70 to rotate annular timing plate 61 in a clockwise direction to advance the ignition spark, distributor rotor member 66 being rotated in a counterclockwise direction as indicated by the arrow. Electronic timer circuit 80 is arranged to produce an output ignition spark advance signal of a pulse width long enough to energize motor 70 for a period of time which will advance the ignition spark 1° to 2°.

In the meantime, the logic 1 output clock signal pulse of electronic timer circuit 56 falls to substantially ground potential. Upon the fall of this logic 1 signal, electronic timer circuit 57 is triggered to the condition in which a logic 1 output reset signal is present upon the output terminal thereof which is applied through resistor 58 to the base electrode of NPN transistor 30 in the proper polarity relationship to produce base-emitter drive current through a type NPN transistor. This base-emitter drive current triggers transistor 30 conductive through the collector-emitter electrodes thereof to provide a discharge path for capacitor 11. Upon the conduction of transistor 30, therefore, capacitor 11 is reset to place the circuitry which produces the peak cylinder combustion pressure initiating signal in condition for operation upon the next firing of the monitored engine cylinder No. 1.

One example of a conventional, commercially available timer circuit suitable for use with this invention is the NE/SE555 timing circuit marketed by the Motorola Corporation.

As engine 50 continues in the "Run" mode, upon the next firing of monitored engine cylinder No. 1, the cylinder combustion pressure within combustion chamber 6 increases. The resulting linearly increasing direct current output potential of pressure transducer 5 is amplified by operational amplifier 10, the output potential of which charges capacitor 11. Assuming that the peak cylinder combustion pressure in combustion chamber 6 increases to a value greater than the second higher predetermined high peak cylinder combustion pressure value during this combustion period, the peak cylinder combustion pressure indicating signal across capacitor 11 is of a potential magnitude greater than the reference voltage applied to each of comparator circuits 12 and 13. With this condition, a logic 0 signal appears upon the output terminal of comparator circuit 12 which is applied to one of the input terminals of conventional NAND gate 53 and a logic 1 signal appears upon the output terminal of comparator circuit 13 which is applied to one of the input terminals of conventional NAND gate 54. As engine 50 continues to run, an ignition spark potential is next initiated for engine cylinder No. 3 which is directed to engine spark plug 3S through distributor rotor 51 and spark plug lead 59 in a manner well-known in the automotive art. The increasing magnetic flux field resulting from the flow of arc current through lead 59 induces an electrical signal in pickup coil 52 of a positive polarity upon terminal end 52a thereof with respect to point of reference or ground potential 3. This electrical signal is inverted by a conventional commercially available inverter circuit 55 and applied to the input terminal of electronic timer circuit 56. Upon the fall of the output signal of inverter circuit 55 toward ground potential, timer circuit 56 is triggered to the condition in which the logic 1 output clock signal appears upon the output terminal thereof which is simultaneously applied to the other input terminal of each of the two input NAND gates 53 and 54. As a NAND gate produces a logic 0 output signal only with the presence of a logic 1 signal upon both of the input terminals thereof, a logic 1 signal is present upon the output terminal of NAND gate 53 and a logic 0 signal appears upon the output terminal of NAND gate 54. Upon the fall of the NAND gate 54 output signal, a conventional commercially available electronic timer circuit 87 is triggered to the condition in which a logic 1 ignition spark retard signal is present upon the output terminal thereof which is applied to the base electrode of each of NPN transistors 88 and 89 through respective resistors 90 and 91 in the proper polarity relationship to produce base-emitter drive current through an NPN transistor. This base-emitter drive current triggers transistors 88 and 89 conductive through the collector-emitter electrodes thereof to complete an energizing circuit for motor 70 which may be traced from the positive polarity terminal 85 of the direct current potential source, through resistor 92, the collector-emitter electrodes of transistor 88, through motor 70 in a direction from brush 70b to brush 70a, through the collector-emitter electrodes of transistor 89 and point of reference or ground potential 3 to the negative polarity terminal of the direct current potential source. Motor 70 is so arranged that with current flow therethrough from brush 70b toward brush 70a, the direction of rotation thereof is such that lead screw 72 of FIG. 3 is rotated in the direction which will move carriage member 73 in a direction away from motor 70 to rotate annular timing plate 61 in a counterclockwise direction to retard the ignition spark, distributor rotor member 66 being rotated in a counterclockwise direction as indicated by the arrow. Electronic timer circuit 87 is arranged to produce an output ignition spark retard signal of a pulse width long enough to energize motor 70 for a period of time which will retard the ignition spark 1° to 2°.

In the meantime, the logic 1 output clock signal pulse of electronic timer circuit 56 falls to substantially ground potential. Upon the fall of this logic 1 signal, electronic timer circuit 57 is triggered to the condition in which the logic 1 output reset signal is present upon the output terminal thereof which is applied through resistor 58 to the base electrode of NPN transistor 30 in the proper polarity relationship to produce base-emitter drive current through a type NPN transistor. This base-emitter drive current triggers transistor 30 conductive through the collector-emitter electrodes thereof to provide a discharge path for capacitor 11. Upon the conduction of transistor 30, therefore, capacitor 11 is reset to place the circuitry which produces the peak cylinder combustion pressure initiating signal in condition for operation upon the next firing of the monitored engine cylinder No. 1.

As engine 50 continues in the "Run" mode, upon the next firing of monitored engine cylinder No. 1, the cylinder combustion pressure within combustion chamber 6 increases. The resulting linearly increasing direct current output potential of pressure transducer 5 is amplified by operational amplifier 10, the output potential of which charges capacitor 11. Assuming that the peak cylinder combustion pressure in combustion chamber 6 increases to a value greater than the first predetermined low peak cylinder combustion pressure value but less than the second higher predetermined high peak cylinder combustion pressure value during this combustion period, the peak cylinder combustion pressure indicating signal across capacitor 11 is of a potential magnitude greater than the reference voltage applied to comparator circuit 12 but less than the reference voltage applied to comparator circuit 13. With this condition, a logic 0 signal appears upon the output terminal of each of comparator circuits 12 and 13 which are applied to one each of the input terminals of respective conventional NAND gates 53 and 54. As engine 50 continues to run, an ignition spark potential is next initiated for engine cylinder No. 3 which is directed to engine spark plug 3S through distributor rotor 51 and spark plug lead 59 in a manner well-known in the automotive art. The increasing magnetic flux field resulting from the flow of arc current through lead 59 induces an electrical signal in pickup coil 52 of a positive polarity upon terminal end 52a thereof with respect to point of reference or ground potential 3. This electrical signal is inverted by a conventional commercially available inverter circuit 55 and applied to the input terminal of electronic timer circuit 56. Upon the fall of the output signal of inverter circuit 55 toward ground potential, timer circuit 56 is triggered to the condition in which the logic 1 output clock signal appears upon the output terminal thereof which is simultaneously applied to the other input terminal of each of the two input NAND gates 53 and 54. As a NAND gate produces a logic 0 output signal only with the presence of a logic 1 signal upon both of the input terminals thereof, a logic 1 signal is present upon the output terminal of both of NAND gates 53 and 54. Since the output logic signal of neither NAND gate 53 nor 54 has transitioned from a logic 1 to a logic 0, electronic timer circuits 80 and 87 are not triggered for an ignition timing adjustment. This corresponds to the required action desired when the peak cylinder combustion pressure is within the low and high peak cylinder combustion pressure limits.

In the meantime, the logic 1 output clock signal pulse of electronic timer circuit 56 falls to substantially ground potential. Upon the fall of this logic 1 signal, electronic timer circuit 57 is triggered to the condition in which the logic 1 output reset signal is present upon the output terminal thereof which is applied through resistor 58 to the base electrode of NPN transistor 30 in the proper polarity relationship to produce base-emitter drive current through a type NPN transistor. This base-emitter drive current triggers transistor 30 conductive through the collector-emitter electrodes thereof to provide a discharge path for capacitor 11. Upon the conduction of transistor 30, thereof, capacitor 11 is reset to place the circuitry which produces the peak cylinder combustion pressure initiating signal in condition for operation upon the next firing of the monitored engine cylinder No. 1.

As engine 50 continues to operate in the "Run" mode, the sequence of events hereinabove described periodically update the cylinder firing angle every two crankshaft revolutions by advancing the firing angle when the peak cylinder combustion pressure is less that the first predetermined value and retarding the firing angle when the peak cylinder combustion pressure is greater than the second higher predetermined value.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. An internal combustion engine ignition spark timing system modulated by cylinder combustion pressure for use with internal combustion engines equipped with an ignition system for sequentially firing the engine cylinders including an ignition spark initiating mechanism of the type operable to advance or retard the ignition spark, comprising: means for producing during each power stroke of a selected monitored engine cylinder an electrical peak cylinder combustion pressure indicating signal of a potential magnitude directly proportional to the peak combustion pressure of said monitored engine cylinder during said power stroke; first means including first timer circuit means responsive to each said peak cylinder combustion pressure indicating signal of a potential magnitude less than a first predetermined value for producing an output ignition spark advance signal of a predetermined pulse width; second means including second timer circuit means responsive to each said peak cylinder combustion pressure indicating signal of a potential magnitude greater than a second higher predetermined value for producing an output ignition spark retard signal of a predetermined pulse width; and means responsive to each said ignition spark advance signal for operating said ignition spark initiating mechanism to advance the ignition spark and to each said ignition spark retard signal for operating said ignition spark initiating mechanism to retard the ignition spark.

2. An internal combustion engine ignition spark timing system modulated by cylinder combustion pressure for use with internal combustion engines equipped with an ignition system for sequentially firing the engine cylinders including an ignition spark initiating mechanism of the type operable to advance or retard the ignition spark, comprising: means for producing during each power stroke of a selected monitored engine cylinder an electrical peak cylinder combustion pressure indicating signal of a potential magnitude directly proportional to the peak combustion pressure of said monitored engine cylinder during said power stroke; means for producing an electrical clock signal in response to the firing of an engine cylinder other than said monitored engine cyliner; first means responsive to each said peak cylinder combustion pressure indicating signal of a potential magnitude less than a first predetermined value and said clock signal for producing an output ignition spark advance signal; second means responsive to each said peak cylinder combustion pressure indicating signal of a potential magnitude greater than a second higher predetermined value and said clock signal for producing an output ignition spark retard signal; and means responsive to each said ignition spark advance signal for operating said ignition spark initiating mechanism to advance the ignition spark and to each said ignition spark retard signal for operating said ignition spark initiating mechanism to retard the ignition spark.

3. An internal combustion engine ignition spark timing system modulated by cylinder combustion pressure for use with internal combustion engines equipped with an ignition system for sequentially firing the engine cylinders including an ignition spark initiating mechanism of the type operable to advance or retard the ignition spark, comprising: means for producing during each power stroke of a selected monitored engine cylinder an electrical peak cylinder combustion pressure indicating signal of a potential magnitude directly proportional to the peak combustion pressure of said monitored engine cylinder during said power stroke; first circuit means for producing an output electrical signal in response to each said peak cylinder combustion pressure indicating signal of a potential magnitude less than a first predetermined value; second circuit means for producing an output electrical signal in response to each said peak cylinder combustion pressure indicating signal of a potential magnitude greater than a second higher predetermined value, said first and second circuit means being mutually exclusive; means for producing an electrical clock signal in response to the firing of an engine cylinder other than said monitored engine cylinder; means for producing an output ignition spark advance signal in response to each said output signal of said first circuit means and said clock signal; means for producing an output electrical ignition spark retard signal in response to each said output signal of said second circuit means and said clock signal; and means responsive to each said ignition spark advance signal for operating said ignition spark initiating mechanism to advance the ignition spark and to each said ignition spark retard signal for operating said ignition spark initiating mechanism to retard the ignition spark.

4. An internal combustion engine ignition spark timing system modulated by cylinder combustion pressure for use with internal combustion engines equipped with an ignition system for sequentially firing the engine cylinders including an ignition spark initiating mechanism of the type operable to advance or retard the ignition spark, comprising: means for producing during each power stroke of a selected monitored engine cylinder an electrical peak cylinder combustion pressure indicating signal of a potential magnitude directly proportional to the peak combustion pressure of said monitored engine cylinder during said power stroke; first circuit means for producing an output electrical signal in response to each said peak cylinder combustion pressure indicating signal of a potential magnitude less than a first predetermined value; second circuit means for producing an output electrical signal in response to each said peak cylinder combustion pressure indicating signal of a potential magnitude greater than a second higher predetermined value, said first and second circuit means being mutually exclusive; means for producing an electrical clock signal in response to the firing of an engine cylinder other than said monitored engine cylinder; means responsive to each said clock signal for producing an electrical reset signal; means for producing an output electrical ignition spark advance signal in response to each said output signal of said first circuit means and said clock signal; means for producing an output electrical ignition spark retard signal in response to each said output signal of said second comparator circuit and said clock signal; means responsive to each said ignition spark advance signal for operating said ignition spark initiating mechanism to advance the ignition spark and to each said ignition spark retard signal for operating said ignition spark initiating mechanism to retard the ignition spark; and means responsive to said reset signal for resetting and thereby conditioning said means for producing said peak cylinder combustion indicating signal for operation upon the next firing of said monitored engine cylinder in succession.

5. An internal combustion engine ignition spark timing system modulated by cylinder combustion pressure for use with internal combustion engines equipped with an ignition system for sequentially firing the engine cylinders including an ignition spark initiating mechanism of the type operable to advance or retard the ignition spark, comprising: means for producing during each power stroke of a selected monitored engine cylinder an electrical peak cylinder combustion pressure indicating signal of a potential magnitude directly proportional to the peak combustion pressure of said monitored engine cylinder during said power stroke; a first comparator circuit for producing an output electrical signal in response to each said peak cylinder combustion pressure indicating signal of a potential magnitude less than a first predetermined value; a second comparator circuit for producing an output electrical signal in response to each said peak cylinder combustion pressure indicating signal of a potential magnitude greater than a second higher predetermined value, said first and second comparator circuits being mutually exclusive; means for producing an electrical clock signal in response to the firing of an engine cylinder other than said monitored engine cylinder; means responsive to each said clock signal for producing an electrical reset signal; circuit means including an electrical gate circuit and an electrical pulse generating circuit for producing an output electrical ignition spark advance signal of a predetermined pulse width as determined by said pulse generating circuit in response to each said output signal of said first comparator circuit and said clock signal; circuit means including another electrical gate circuit and another electrical pulse generating circuit for producing an output electrical ignition spark retard signal of a predetermined pulse width as determined by said pulse generating circuit in response to each said output signal of said second comparator circuit and said clock signal; a bi-directional electric motor responsive to each said ignition spark advance signal for operating said ignition spark initiating mechanism to advance the ignition spark and to each said ignition spark retard signal for operating said ignition spark initiating mechanism to retard the ignition spark; and means responsive to said reset signal for resetting and thereby conditioning said means for producing said peak cylinder combustion indicating signal for operation upon the next firing of said monitored engine cylinder in succession.

* * * * *